(12) United States Patent
Chow et al.

(10) Patent No.: US 7,038,612 B2
(45) Date of Patent: May 2, 2006

(54) METHOD FOR SAR PROCESSING WITHOUT INS DATA

(75) Inventors: James G. Chow, Tucson, AZ (US); Robert A. Rosen, Simi Valley, CA (US); Kapriel V. Krikorian, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/634,303

(22) Filed: Aug. 5, 2003

(65) Prior Publication Data

US 2005/0073455 A1     Apr. 7, 2005

(51) Int. Cl.
*G01S 13/90*     (2006.01)

(52) U.S. Cl. ................ 342/25 F; 342/25 R; 342/25 A; 342/25 E; 342/175; 342/190; 342/191; 342/194; 342/195; 342/196

(58) Field of Classification Search .... 342/25 R–25 F, 342/59, 82–103, 104, 105, 109, 118, 165–175, 342/176, 179, 189–197
See application file for complete search history.

(56) References Cited

U.S. PATENT DOCUMENTS

| | | | |
|---|---|---|---|
| 4,067,009 A * | 1/1978 | Constant | 342/25 R |
| 4,706,088 A * | 11/1987 | Weindling | 342/25 R |
| 4,706,089 A * | 11/1987 | Weindling | 342/25 R |
| 4,724,418 A * | 2/1988 | Weindling | 342/25 R |
| 4,924,229 A * | 5/1990 | Eichel et al. | 342/25 R |
| 5,021,789 A | 6/1991 | Shaw | |
| 5,760,732 A | 6/1998 | Marmarelis et al. | |
| 5,854,602 A * | 12/1998 | Stankwitz et al. | 342/25 R |
| 6,037,892 A * | 3/2000 | Nikias et al. | 342/25 R |
| 6,088,295 A * | 7/2000 | Altes | 342/25 A |
| 6,603,424 B1 * | 8/2003 | Abatzoglou | 342/25 R |
| 6,781,541 B1 * | 8/2004 | Cho | 342/195 |

OTHER PUBLICATIONS

Moreira, Alberto, "Real-Time Synthetic Aperture Radar (SAR) Processing With a New Subaperture Approach," IEEE Trans. on Geoscience & Remote Sensing, Jul. 30 (1992), No. 4, New Yorj, US.

Mastin, Gary A., et al, "A Massively Parallel Digital Processor for Spotlight Synthetic Aperture Radar," The Int'l Jnl. of Supercomputer Applications, Jul. (1993) Summer, No. 2, Cambridge, MA, US.

* cited by examiner

*Primary Examiner*—Bernarr E. Gregory
(74) *Attorney, Agent, or Firm*—Leonard A. Alkov; Karl A. Vick

(57) ABSTRACT

A Synthetic Aperture Radar (SAR) avoids the need for an INS/GPS by focusing a SAR image having discernible features and a center. The image is formed from digitized returns, each of the digitized returns having a phase and an amplitude. The focusing steps of an algorithm processing the digitized returns include: computing a coarse range and coarse range rate of the center of the image, motion compensating the digitized returns, converting the digitized returns in polar format into an orthogonal Cartesian coordinate system, autofocusing the image data to obtain a focused image, performing a Fourier transform to obtain a focused image described by the returns, computing an estimated fine range and fine range rate from features contained within the focused image, and converging the fine range and fine range rate within the orthogonal Cartesian coordinate system for use within the azimuth and range coordinate system and motion compensating the digitized returns.

6 Claims, 5 Drawing Sheets

METHOD FOR SAR PROCESSING WITHOUT INS DATA

BACKGROUND OF THE INVENTION

1. Field of Invention

This invention is in the field of Synthetic Aperture Radar image focusing with-out platform position updates from an inertial navigation (INS)/Ground Positioning Satellite (GPS) system.

2. Description of the Related Art

Synthetic Aperture Radar (SAR) radar is used for ground mapping as well as target identification. The general principle behind SAR is to obtain high resolution images by coherently combining the amplitude and phase information of separate radar returns from a plurality of sequentially transmitted pulses from a relatively small antenna on a moving platform. The returns from the plurality of pulses transmitted during a SAR image, when coherently combined and processed, result in image quality comparable to a longer antenna, corresponding approximately to the synthetic "length" traveled by the antenna during the acquisition of the image.

High resolution SAR maps are obtained by coherently combining return signals reflected from transmitted pulses in the cross range direction from radar platform movement. Historically, formation of focused SAR images or maps required accurate information on platform position and velocity to shift and focus the received radar returns so as to have a useful, detailed combination of pulse returns from multiple pulses transmitted at different times from different radar positions. The process of aligning pulses in time and space for coherent integration is referred to as motion compensation, and is usually performed with the raw radar data, at the early stage of the image formation process.

The plurality of returns forming the image generated by the transmitted pulses along a known path of the platform make up an array length. During the array length, amplitude as well as phase information (in phase (I) and quadrature(Q) components) returned from reception of returns from each transmitted pulse, for each of many range bins, is preserved. The SAR image is formed and focused from the coherent combination of the amplitude and phase of return(s) within each range bin, motion compensated for spatial displacement of the moving platform during the acquisition of the returns for the duration of the array length.

One aspect of achieving coherent integration of pulses into one image is the need for an INS/GPS to indicate the spatial and time coordinates of each transmitted and received (or reflected) pulse. These time and space coordinates of radar returns need to be known to a relatively high accuracy, typically in fractions of a wavelength, to arrive at a clear, focused, unsmeared image. The INS/GPS is disadvantageous. An INS/GPS is an expensive, heavy and computationally burdensome item, comprising accelerometers as well as acceleration/velocity integrating means to ascertain moving platform location as a function of time. The INS/GPS presents a computationally intensive requirement of time stamping each individual radar return. This is followed by subsequent coherently alignment in time/space with the other SAR radar returns forming the image with respect to a central image feature.

Attempts at reducing the accuracy of an INS/GPS system to arrive at a focused SAR image have been previously discussed. Autofocus phase error estimates and corrections have been made where the INS/GPS information was too coarse, or inaccurate, precluding a well focused image from using platform motion information only. Such an autofocus improvement was described in U.S. Pat. No. 4,924,229 to P. H. Eichel, D. G. Ghiglia, C. V Jakowatz, Jr. titled *Phase Correction System for Automatic Focussing of Synthetic Aperture Radar*, May 8, 1990.

The need for a INS/GPS remained, along with its expense, and contribution to reduced SAR radar reliability and increased complexity.

SUMMARY OF THE INVENTION

The present invention avoids the need for an INS/GPS by focusing a SAR image having discernible features and a center. The image is formed from digitized returns, each of said digitized returns having a phase and an amplitude. The returns are generated from separate pulses transmitted from a plurality of locations.

The focusing method comprises the steps of:

storing said digitized returns forming said image in a memory, where said returns are acquired in an azimuth and a range coordinate system;

searching within said memory for returns descriptive of said features;

computing a coarse range and coarse range rate of the center of said image from the change in position of said features within said azimuth and said range coordinate system;

motion compensating said digitized returns forming said image using said coarse range and coarse range rate to form a coarse image;

converting said digitized returns in polar format forming said coarse image from said azimuth and range coordinate system into an orthogonal Cartesian coordinate system where said digitized returns are adjusted in phase and amplitude to form an evenly spaced image data within said orthogonal Cartesian coordinate system autofocusing said evenly spaced image data to obtain a focused image;

performing a two dimensional Fourier transform to obtain a focused image described by the returns;

testing said focused image for a focus quality computing an estimated (fine) range and (fine) range rate from features contained within said focused image;

converting said fine range and said fine range rate within said orthogonal Cartesian coordinate system for use within said azimuth and range coordinate system and motion compensating said digitized returns using said fine range and said fine range rate;

iterating said motion compensating step and said subsequent steps using said fine range and said fine range rate until said attributes of said focus quality reach a predefined level.

Once an acceptable quality of the SAR image is achieved, the iteration is stopped and the image is displayed or transmitted to other analytical mechanisms.

The autofocus step generates a phase error, said phase error is converted to an adjustment to said fine range. The adjustment is fed back to the motion compensating step.

A range pre-filter/decimation is optionally applied to the coarse image obtained from said motion compensating step as well as an azimuth pre-filter/decimation to reduce the data rate.

DETAILED DESCRIPTION

The present invention describes an apparatus and method of focusing SAR images without the use of inertial navigation system/Ground Position Satellite system (INS/GPS) moving platform motion information.

Figure 1:
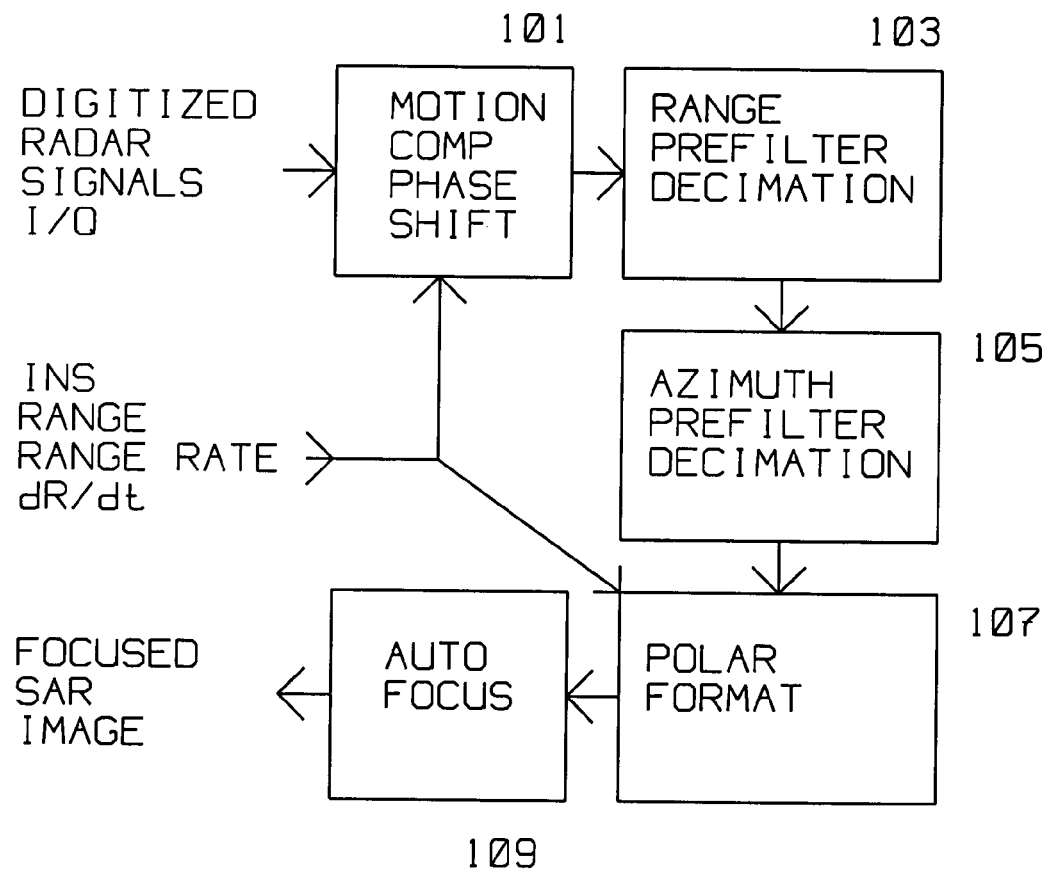
FIG. 1 is a typical configuration of the prior art where INS data is used to focus the SAR image.

FIG. 1 shows the prior art approach to generating an focused SAR image. Digitized radar signals (the I and Q components) are phase shifted by motion compensation 101. This motion compensation is required to reduce phase errors to the point where known autofocus algorithms can function well, and reduce the phase errors further. Motion compensation 101 adjusts the starting phase and frequency of returned pulses in response to the changing range such that the phase of the returned pulse at the image center remains constant. Motion compensation 101 uses range and range rate information computed from the INS/GPS data. Typically, range pre-filter 103 with (optional) decimation and azimuth pre-filter 105 with (optional) decimation process the motion compensated raw data. Decimation is applied to reduce the data rate.

Following azimuth pre-filter 105, polar format 107 is applied to the I and Q phase history to eliminate range walk and other non-linear phase effects for scatterers offset from the image center. The polar format requires a position vector descriptive of the location of each radar pulse along the array. This position vector eliminates the range walk.

With range walk eliminated (or sharply reduced), range compression and auto-focus 109 is applied to the I and Q phase history of the image based on the assumption that the phase error is constant over the image. The result is a focused SAR image.

Figure 2:
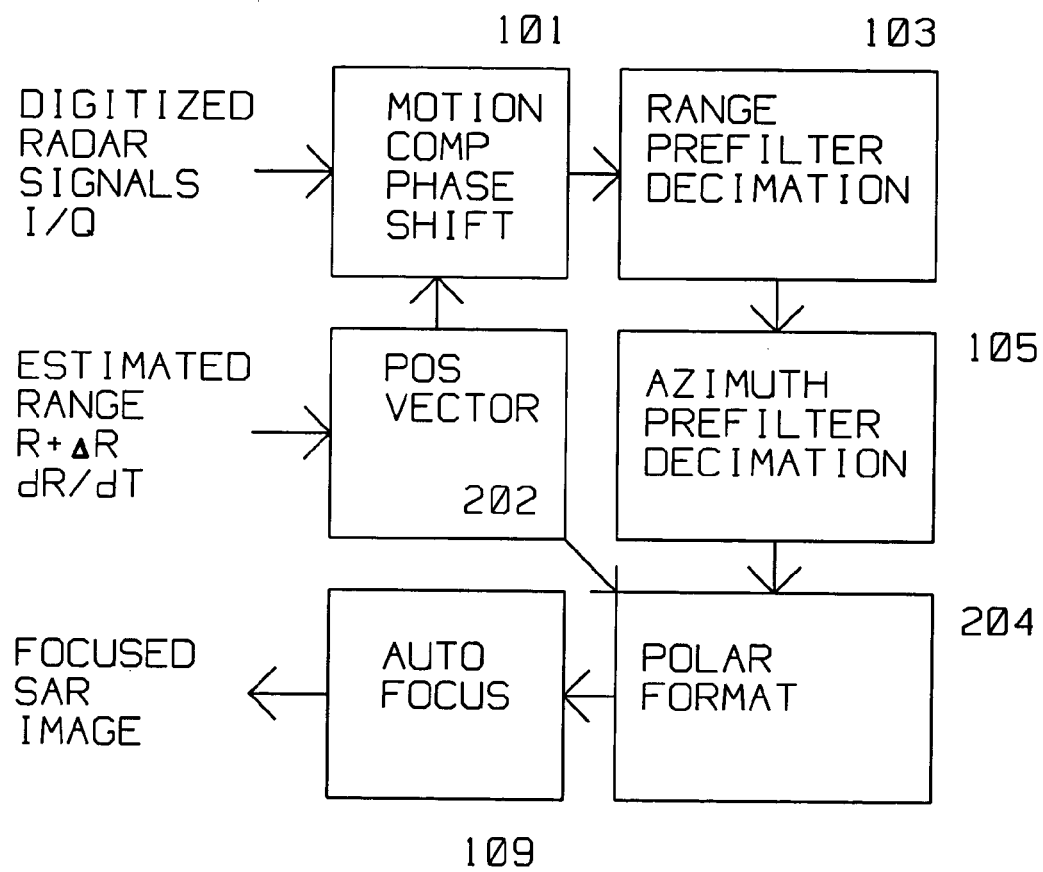
FIG. 2 is an exemplary configuration of this invention where a position vector derived from the SAR data itself is used for Range and Range rate determination.

In contrast to the prior art of FIG. 1, FIG. 2 outlines the present invention where the necessary estimated range R+ΔR and range rate dR/dT is not derived from INS/GPS but rather from the radar returns forming the image. Position vector 202 generated from radar returns interfaces with the rest of the system as described in FIG. 1.

Part I—Coarse Motion Compensation

The first part of the method used for a monostatic radar obtains coarse range and range rate estimates, and comprises the following steps.

1. Perform a two dimensional FFT at sequential sub-intervals on the I and Q radar data to identify the beam footprint and strong scatterers and other image features within the footprint.

2. Track strong scatterers and features in Doppler (frequency) and range using centroiding and/or two dimensional image correlation or any other method for identifying the transition of a scatterer across separate range bins. Tracking the movement of a stationary strong scatterer across range bins estimates the range rate dR/dT along the aperture.

3. Compute range to the strong scatterer identified in (2) based on its range rate dR/dT, range to map center, and known, transmitted chirp slope, IF frequency, pulse repetition frequency (PRF) and number of pulses in the SAR array. The chirp slope is the linear frequency modulation of pulses having a linearly varying carrier frequency. With such chirped pulses, the reflection delay is indicative of distance as determined by the frequency of the received radar reflection upon demodulation.

Having applied the coarse range and range rate, from 1, 2,and 3 above for motion compensation of the data, the raw SAR map can now be centered on a region of interest. This centering is done by manipulating the Doppler and slant range, i.e. adjusting the range rate and range, respectively. With this coarse motion compensation, corner reflectors part of the image will be streaks across slant range bins and shapes are barely discernible.

Part II—Polar Format

Data samples of target return amplitude versus frequency that are taken as the target shift position (rotate) with respect to the moving platform are said to be collected in a polar format. Although such "polar" data may be collected at uniformly spaced frequency steps and rotation angle positions, the data samples are non-uniformly spaced in a rectangular format typically called the frequency space. However, subsequent Fourier transform(s) require(s) uniform sample spacing for proper computation and domain conversion. The result of the non-uniform spacing is that the two dimensional Fourier transforms from frequency space to target space result in unfocused SAR images for the typically larger rotation angles used for high resolution images. Thus, "polar format" refers to a process for re-sampling or shifting data, from polar to a rectangular format, such as an orthogonal Cartesian coordinate system, producing uniformly spaced data in two dimensional frequency space. Applying two dimensional Fourier transforms to this re-ordered frequency space produces focused images from the now uniformly spaced data.

Polar format 204 described in this invention eliminates the interpulse non-linear phase differences including motion through range bins. Polar format 204 requires a position vector descriptive of the radar receiver position at each pulse in the array. By assuming that the platform is moving in a straight line at a constant altitude above the plane of the target, and using the estimated range from the map center to array center along with the range rate, platform velocity and squint angle, the North East down coordinates of each pulse in the array are simulated.

A typical scenario applicable for this invention is where the moving radar platform is 10 degrees off broad side from the map center, having a uniform speed of 50 meters/sec at 6000 ft above mean sea level, and a slant range of 8.22 Km. The target is always at one side (e.g. the port side) of the moving platform. The actual direction and position coordinates are unnecessary as the needed corrections are extracted from the radar data. Only an array of simulated positions plausible for the estimated range rate and range is required.

In the bistatic radar case, or for more complicated platform motion, it may be more advantageous to derive the polar format parameters directly from the range and range tracks.

The track outputs and associated parameters to be generated by position vector 202 are extracted for use by polar format 204 using the method outlined below. Let $\Delta r_0$ and $\Delta rd_0$ be the range and range rate respectively of a scatterer relative to the center scatterer at mid array. Let $\Delta r$ and $\Delta rd$ be the range and range rate of the same scatterer at another time. The best linear match between these quantities is found using, for example, a least squares solution across strong scatterer or subpatches. Then:

$$\begin{bmatrix} \Delta r \\ \Delta rd \end{bmatrix} = M \begin{bmatrix} \Delta r_0 \\ \Delta rd_0 \end{bmatrix} \quad (1)$$

Where the 2 by 2 M matrix is time dependent. Let $\tau$ be the intra pulse time scaled by 2/c, where c is the speed of light, (or, to be exact, the speed of propagation of a radar pulse in air) and let t be the time pulse scaled by 2/$\lambda$, where $\lambda$ is the center wavelength. Thus, at mid array, $$\frac{\partial \phi}{\partial \tau} = \Delta r_0 \text{ and } \frac{\partial \phi}{\partial \tau} = \frac{d(\Delta r_0)}{dt} \quad (2)$$

where $\phi$ is the scatterer phase.

The polar format 204 variables u and v, are chosen such that the first order partial derivatives of $\phi$ with respect to u and v are constant across the array, assuming the linear relationship of Eq (1). For simplicity u and v are chosen as constants so that they match the derivatives of $\tau$ and t at mid array. Hence, the partial derivatives of t and $\tau$ with respect to u and v define the output grid spacing relative to the input grid. Define the matrix of these derivatives by $$Q = \begin{bmatrix} \frac{\partial \tau}{\partial u} & \frac{\partial \tau}{\partial v} \\ \frac{\partial t}{\partial u} & \frac{\partial t}{\partial v} \end{bmatrix} \quad (3)$$

Then $$\begin{bmatrix} \Delta r_0 \\ \Delta rd_0 \end{bmatrix} = \begin{bmatrix} \frac{\partial \phi}{\partial u} \\ \frac{\partial \phi}{\partial v} \end{bmatrix} = Q \begin{bmatrix} \frac{\partial \phi}{\partial \tau} \\ \frac{\partial \phi}{\partial t} \end{bmatrix} = Q \begin{bmatrix} \Delta r \\ \Delta rd \end{bmatrix} = QM \begin{bmatrix} \Delta r_0 \\ \Delta rd_0 \end{bmatrix} \quad (4)$$

Figure 3:
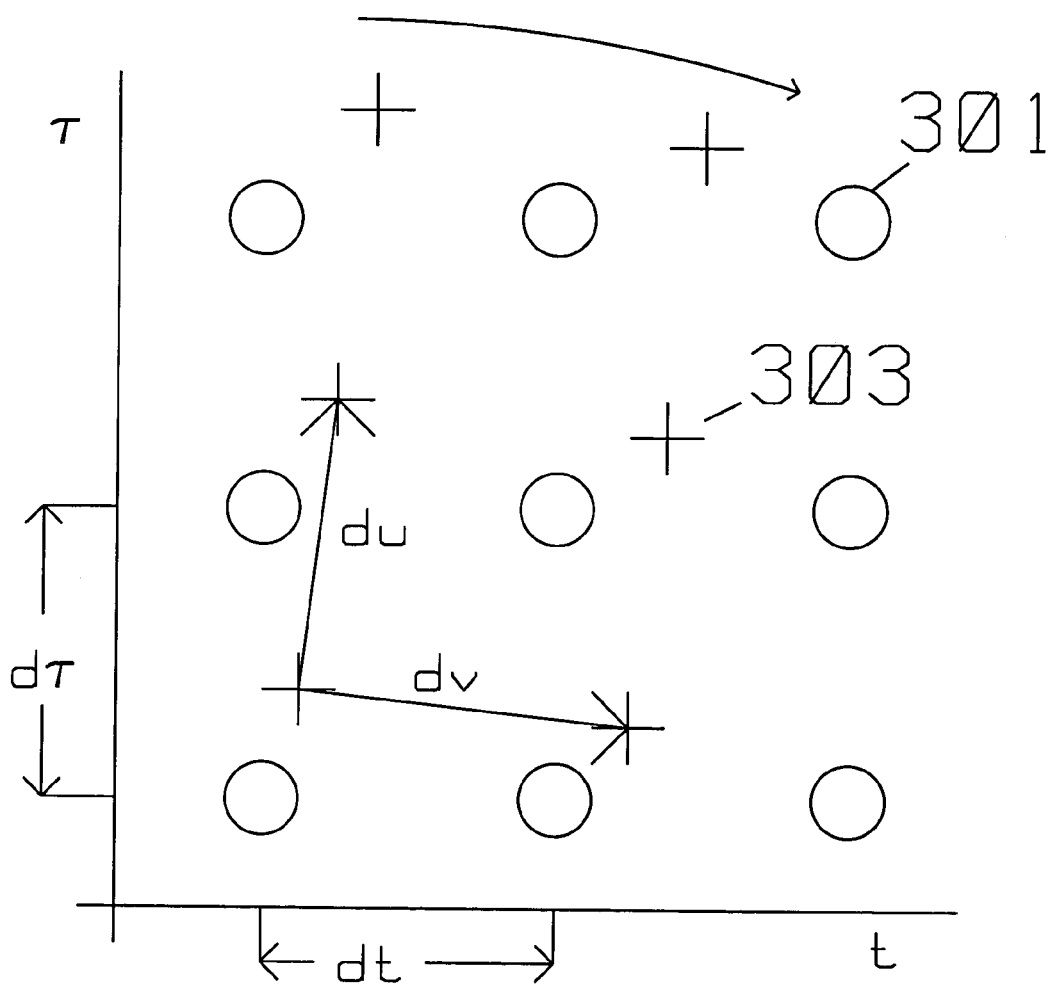
FIG. 3 shows the polar format of collected radar returns and their rearrangement in a uniform pattern compatible with subsequent Fourier transforms.

Hence, $Q = M^{-1}$. This defines the two dimensional spacing of the grid to which the polar format algorithm interpolates at any time. Thus, if dr and dt are intrapulse and pulse to pulse spacing respectively, of the data samples entering the polar format processing, the spacing of the output grid points is given by:

$$d\vec{u} = \begin{bmatrix} Q_{11} d\tau \\ Q_{12} dt \end{bmatrix} \text{ and } d\vec{v} = \begin{bmatrix} Q_{21} d\tau \\ Q_{22} dt \end{bmatrix} \quad (5)$$

where the first components of each vector is the $\tau$ component and the second is the t component, as shown in FIG. 3. In FIG. 3, 301 is an example of a point that has been shifted to obtain orderly, uniformly distributed samples in an orthogonal Cartesian coordinate system from polar samples, such as 303. Target rotation shown refers to the apparent target movement with respect to the moving platform for the example in this invention.

C. Autofocus

Following polar format 204, a modified range compression and auto—focus methods are applied to the complex (I and Q) phase history of the return. The modified autofocus applied is the Phase Gradient Algorithm (PGA) which assumes that the phase error is constant over the entire SAR map. PGA is described in U.S. Pat. No. 4,924,229 to P. H. Eichel, D. G. Ghiglia, C. V Jakowatz, Jr. titled *Phase Correction System for Automatic Focussing of Synthetic Aperture Radar*, May 8, 1990, incorporated herein in its entirety. For this invention, PGA is modified by removing the frequency domain windowing constraint to eliminate the dependence of the window size on the iteration. This change permits more degrees of freedom in the phase corrections.

Phase Corrections

For the stated sample geometry, the initial phase correction for SAR maps computed from INS/GPS sources is approximately 500 radians (30,000 degrees). The subsequent autofocus correction is 10 to 20 radians (600 to 1200 degrees), and requires typically only three iterations to converge to a root mean squared (RMS) threshold.

Conversely, for this invention, where no INS/GPS is used, for the same sample geometry, the motion compensation equivalent processing produced relatively small phase corrections, while the autofocus correction made larger corrections, in the order of 500 radians. However, instead of three iterations, it took 24 to arrive at the same RMS error threshold. The overall phase correction after 24 iterations was comparable to that achieved using INS/GPS. From a qualitative point of view, the images generated using INS/GPS phase correction provided sharper focus for corner reflectors in the scene. While the scene was preserved in the case of no INS/GPS, the focus was softer, with the corner reflectors less sharp.

Autofocus Phase Error Feedback

For 500 radians of autofocus phase error, using the theoretical range resolution, indicates that the range walk spans 2.3 range bins. Having computed the 2.3 range bins from the autofocus error, these 2.3 range bins of additional motion compensation are used to reduce range walk. Thus, use the auto-focus computed phase error from PGA for a monostatic radar to improve overall motion compensation without INS/GPS by computing a $\Delta R$ incremental range, such that $$\Delta R = \frac{\lambda}{4\pi} \phi_{PGA} \quad (6)$$

Figure 4:
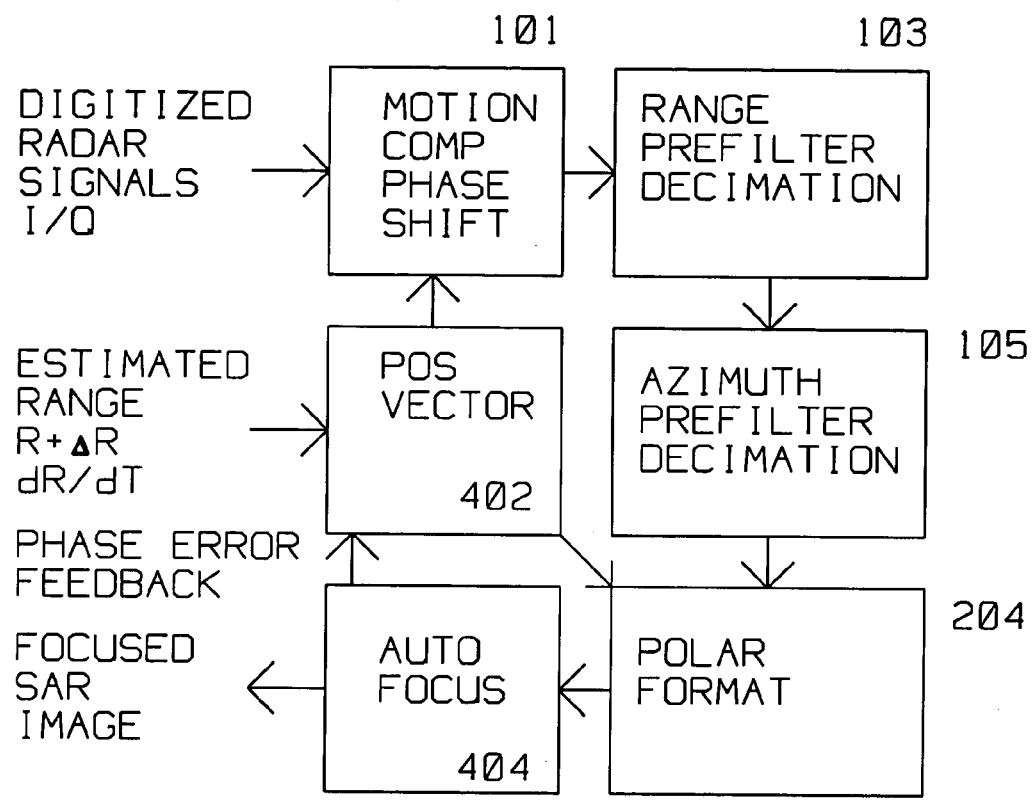
FIG. 4 is an exemplary configuration of this invention where a position vector and motion compensation data is updated using a phase error feedback from an autofocus calculation.

This incremental $\Delta R$ in equation 6 is added to the estimated range computed in the case without INS/GPS, with the estimated range rate dR/dT set to zero. dR/dT is expected to have minimal contribution to the phase correction at this point in the calculation. This is shown in FIG. 4 where phase feedback error is transmitted from autofocus 404 to become part of position vector 402. In turn, position vector 402 supplies motion compensation 101 with the phase feedback error from autofocus 404 to further focus the image.

Figure 5:
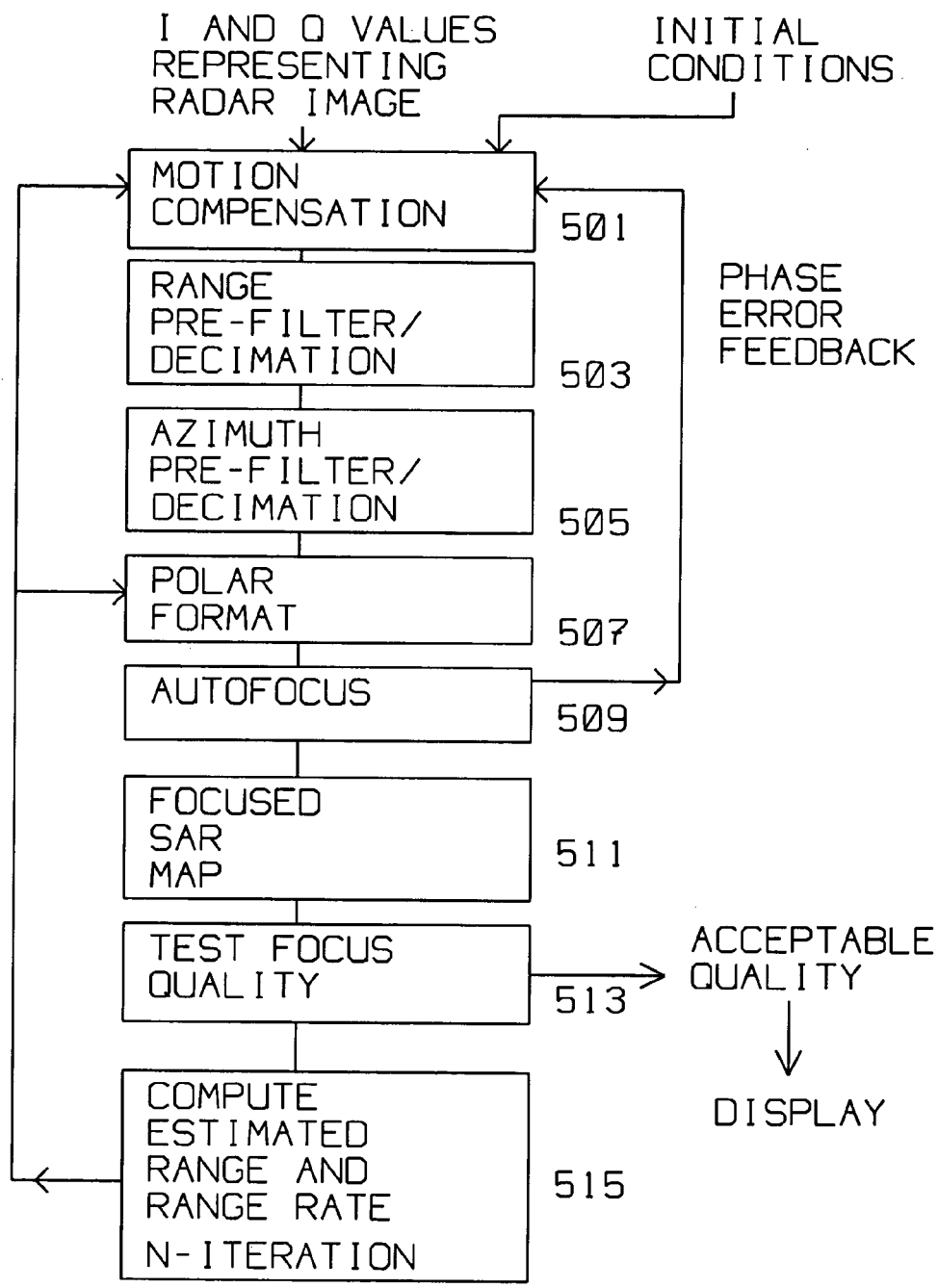
FIG. 5 is the flow diagram of the steps of the method of the present invention, including phase error feedback and the iterative sequence of steps.

FIG. 5 summarizes the method steps of this invention. The method is for focusing an image having features and a center. The image is formed from digitized returns, each of said digitized returns having a phase and an amplitude. The returns are generated from separate pulses transmitted from a plurality of locations.

The focusing method comprises the steps of:

storing said digitized returns forming said image in a memory, where said returns are acquired in an azimuth and a range coordinate system;

searching within said memory for returns descriptive of said features;

computing a coarse range and coarse range rate of the center of said image from the change in position of said features within said azimuth and said range coordinate system;

motion compensating in motion compensation 501 said digitized returns forming said image using said coarse range and coarse range rate to form a coarse image;

converting said digitized returns in polar format 507 forming said coarse image from said azimuth and range coordinate system into an orthogonal Cartesian coordinate system where said digitized returns are adjusted in phase and amplitude to form an evenly spaced image data within said orthogonal Cartesian coordinate system;

autofocusing said evenly spaced image data to obtain a focused image in autofocus 509;

performing a two dimensional Fourier transform to within focus SAR map 511 to obtain a focused image described by the returns;

testing said focused image for a focus quality in test focus quality 513;

computing an estimated (fine) range and (fine) range rate 515 from features contained within said focused image for this iteration;

converting said fine range and said fine range rate within said orthogonal Cartesian coordinate system for use within said azimuth and range coordinate system and motion compensating said digitized returns using said fine range and said fine range rate;

iterating said motion compensating step and said subsequent steps using said fine range and said fine range rate until said attributes of said focus quality reach a predefined level.

Once an acceptable quality of the SAR image is achieved, the iteration is stopped and the image is displayed or transmitted to other analytical mechanisms. One sample test applicable here is to compare the rendition of a well defined feature in the image, such as a corner reflector, to the number of total number of range bins it occupies in the image. Other image quality tests may be applied.

Autofocus 509 generates a phase error, said phase error is converted to an adjustment to said fine range. The adjustment is fed back to the motion compensating step.

A range pre-filter/decimation 503 is optionally applied to the coarse image obtained from said motion compensating step as well as an azimuth pre-filter/decimation 505 to reduce the data rate.

The orthogonal Cartesian coordinate system is compatible with, and minimizes errors from, subsequent application of two dimensional Fourier transforms to said image data.

The adjustment from compute estimated (fine) range and range rate 515 is also used within said polar format step 507 for better operation.

All references cited in this document are incorporated herein in their entirety by reference.

Although presented in exemplary fashion employing specific embodiments, the disclosed structures are not intended to be so limited. For example, the concept described herein is applicable to radar systems as well as sonar imaging.

Those skilled in the art will also appreciate that numerous changes and modifications could be made to the embodiment described herein without departing in any ay from the invention. These changes and modifications and all obvious variations of the disclosed embodiment are intended to be embraced by the claims to the limits set by law.

The invention claimed is:

1. A method for focusing a Synthetic Aperture Radar image having features and a center, said image formed from digitized returns, each of said digitized returns having a phase and an amplitude, said returns generated from separate pulses transmitted from a plurality of locations, comprising the steps of:

storing said digitized returns forming said image in a memory, said returns acquired in an azimuth and a range coordinate system;

searching within said memory for returns descriptive of said features;

computing a coarse range and coarse range rate of the center of said image from the change in position of said features within said azimuth and said range coordinate system;

motion compensating said digitized returns forming said image using said coarse range and coarse range rate to form a coarse image;

polar format converting said digitized returns forming said coarse image from said azimuth and range coordinate system into an orthogonal Cartesian coordinate system where said digitized returns are adjusted in phase and amplitude to form an evenly spaced image data within said orthogonal Cartesian coordinate system;

autofocusing said evenly spaced image data to obtain a focused image;

computing a fine range and fine range rate from features contained within said focused image;

converting said fine range and said fine range rate within said orthogonal Cartesian coordinate system for use within said azimuth and range coordinate system and motion compensating said digitized returns using said fine range and said fine range rate;

iterating said motion compensating step and said subsequent steps using said fine range and said fine range rate until said attributes of said focus quality reach a predefined level.

2. A method as described in claim 1 wherein said autofocusing generates a phase error, said phase error converted to an adjustment to said fine range, said adjustment fed back to said motion compensating step.

3. A method as described in claim 2 wherein said adjustment is used within said polar format step.

4. A method as described in claim 1 wherein a range pre-filter is applied to said coarse image obtained from said motion compensating step.

5. A method as described in claim 1 wherein an azimuth pre-filter is applied to said coarse image obtained from said motion compensating step.

6. A method as described in claim 1 wherein said orthogonal Cartesian coordinate system minimizes errors from subsequent application of two dimensional Fourier transforms to said image data.

* * * * *